E. JOSSE.
TURBINE.
APPLICATION FILED APR. 24, 1912.
1,072,953.
Patented Sept. 9, 1913.
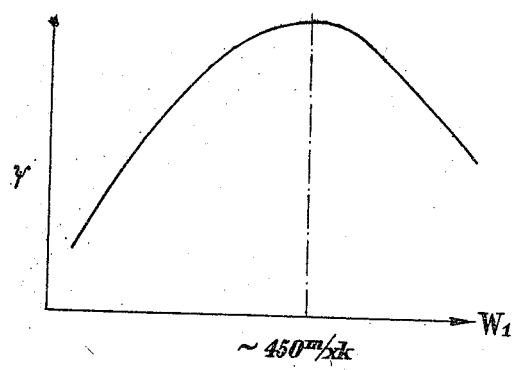
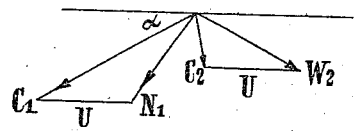
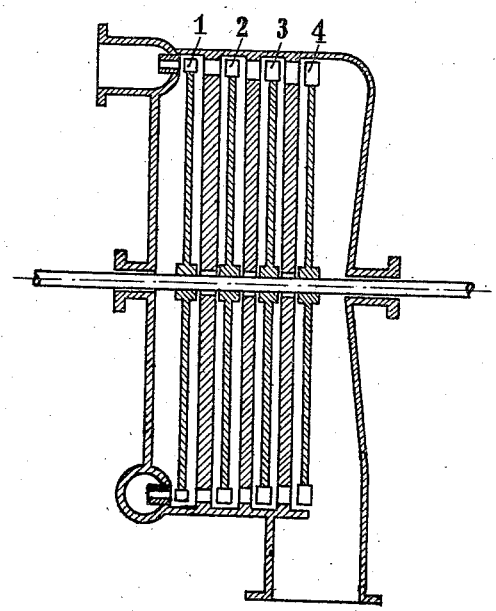

UNITED STATES PATENT OFFICE.

EMIL JOSSE, OF CHARLOTTENBURG, GERMANY.

TURBINE.

1,072,953.　　　Specification of Letters Patent.　　Patented Sept. 9, 1913.

Application filed April 24, 1912. Serial No. 692,831.

*To all whom it may concern:*

Be it known that I, EMIL JOSSE, a subject of the German Emperor, and a resident of Charlottenburg, near Berlin, Germany, have invented certain new and useful Improvements in Turbines, of which the following is a specification.

My invention relates to a turbine without velocity staging and having a velocity exceeding the critical velocity in the guiding devices.

Up to the present day very little has been known about the losses of flow in the rotor blades. By making tests as to the dependence of the losses of flow, or the coefficient of velocity, in the rotor blades on turbine wheels we have found that these losses become a minimum under very definite conditions, which behavior can be explained by the peculiar flow in the rotor blade.

My invention is diagrammatically represented in the accompanying drawing, wherein:

Figures 1 and 2 are diagrams explained hereinafter, and Fig. 3 shows an impulse turbine having four stages.

Referring firstly to Fig. 1, this diagram shows the dependence of the coefficient of velocity $\psi$ established by the tests on the relative inlet velocity $w_1$ into the rotor blade. It will be seen that the maximum coefficient of velocity occurs at a velocity equal to the critical velocity. The left-hand descending part of the curve of the coefficient of velocity $\psi$ is substantially occasioned by the relatively large frictional losses in the flow of the denser medium; the right-hand descending part of the curve embraces the region on the far side of the critical velocity. Owing to the oscillatory phenomena which occur at a velocity exceeding the critical velocity a considerable part of the energy of flow is consumed when obstructions occur in the jet of steam, and consequently occasions an exceedingly rapid increase of the losses. The selection of the relative inlet velocity equal to the critical velocity is thus particularly advantageous when the flow of an elastic medium meets with obstructions.

With regard to the velocity employed in the rotor blades all known systems of turbines operate either entirely below the critical velocity or far above the same, as *e. g.* those of Parson, Zölly and Rateau on the one hand, and that of Laval on the other hand.

Now in order to build a turbine at as small cost as possible and nevertheless to obtain the highest attainable efficiency, according to my invention the number of stages and dimensions of the rotors are so proportioned that the relative inlet velocity $w_1$ into the blade (which constitutes an unavoidable obstruction in the flow of the steam and causes vibrations when the critical velocity is exceeded) is so selected that, according to its order of magnitude, it is approximately equal to the critical velocity, *i. e.* 400–500 meters, according to the state of the steam for the time being. The relative outlet velocity $w_2$ may, however, be selected higher (see Fig. 2) so that subsequent expansion in the rotor blade is allowed. The magnitude of the degree of reaction within the range of 0–0.5 can be selected as desired, within the predetermined limits of velocity, in closest connection with the selected dimensions of the blade. Practical limits to the height of the appertaining peripheral velocities are then set only by the quality of the material employed for constructing the rotors.

Fig. 3 shows an impulse turbine comprising four stages so designed that the number of the stages and proportions of the four rotors 1, 2, 3, 4 are such that the relative inlet velocity into the rotor blades is always approximately equal to the critical velocity.

The objects of my invention may be stated as follows: By means of a minimum expenditure of the best material to obtain the best thermic efficiency of each element of the turbine and thereby of the entire turbine. Simultaneously a considerable increase of the output and with it a diminution of the cost of manufacture, of space required and of the weight of a turbine can be obtained. In addition, there are other advantages, particularly the efficient utilization of the highest attainable vacuum, this not being possible in well known systems in consequence of the limit being reached too early by the maximum length of blade. Also, the regulation of my improved turbine is more favorable than that of turbines known heretofore. Namely, whereas otherwise when the output diminishes, *e. g.* owing to throttling and to closing nozzles, a considerable concentration of output is brought about on the high pressure stage and the low pressure stages are almost completely relieved, according to my invention only an automatic change of the degree of reaction in the various stages occurs, and the best ratios of peripheral velocity to the absolute inlet velocity can still be maintained.

When ordinary guiding apparatus comprising parallel walls are employed as guiding device the turbine itself may comprise say 4–6 stages, and when conically expanded nozzles are employed as guiding device the turbine will comprise say 2–4 stages according in each instance to the further employment of the outlet velocity from the rotor or not. Analogously the same holds good with the changed numbers in question for every other elastic medium, e. g. gas, air or the like, and likewise for turbines having nozzles and blades rotating in opposite directions and, particularly, for unipolar turbines.

What I claim as new and desire to secure by Letters Patent is:

A turbine of the character described, comprising in combination a casing, divided into a selected number of stages, and a rotor of proportionate dimensions selected in such a manner that the relative entrance velocity of the fluid into the buckets of said rotor is equal to the so-called critical velocity, substantially as described.

In testimony whereof I affix my signature in presence of two witnesses.

EMIL JOSSE.

Witnesses:
 HENRY HASPER,
 WOLDEMAR HAUPT.